United States Patent [19]

Malloy

[11] 3,872,629
[45] Mar. 25, 1975

[54] SPLICING OF COATED ABRASIVE MATERIALS

[75] Inventor: John F. Malloy, Waterford, N.Y.

[73] Assignee: Norton Company, Troy, N.Y.

[22] Filed: May 15, 1971

[21] Appl. No.: 253,570

Related U.S. Application Data

[63] Continuation-in-part of Ser. No. 34,105, May 4, 1970, abandoned.

[52] U.S. Cl.......................... 51/295, 51/297, 51/298
[51] Int. Cl........................ C08g 51/12, C08g 41/00
[58] Field of Search ............ 51/293, 295, 297, 298, 51/299

[56] References Cited
UNITED STATES PATENTS

| | | | |
|---|---|---|---|
| 2,431,035 | 11/1947 | Goepfert et al. | 51/297 |
| 2,794,726 | 6/1957 | Riedesel et al. | 51/297 |
| 3,154,897 | 11/1964 | Howard | 51/293 |
| 3,301,644 | 1/1967 | Habib | 51/295 |
| 3,529,945 | 9/1970 | Charvat | 51/295 |
| 3,637,359 | 1/1972 | Malloy | 51/297 |

*Primary Examiner*—Donald J. Arnold
*Attorney, Agent, or Firm*—Oliver W. Hayes

[57] ABSTRACT

A dried, partially cured, heat-activatable preformed adhesive film is provided in which the adhesive composition comprises in admixture a hydroxyl terminated polyurethane-polyester and a component having available free isocyanate groups. The partially cured adhesive film can be used in the splicing of coated abrasive ends together as in the formation of endless belts. Interposed between two coated abrasive ends to be joined together, the partially cured adhesive film can be further heated at relatively low temperatures whereby on being subjected to pressure it will flow into intimate contact with the surfaces to be joined. Thus, one is able to form endless belts from a wide variety of coated abrasive materials.

7 Claims, 2 Drawing Figures

PATENTED MAR 25 1975 3,872,629

SPLICING OF COATED ABRASIVE MATERIALS

CROSS REFERENCE TO RELATED APPLICATION

This application is a continuation-in-part of application Ser. No. 34,105 filed May 4, 1970, and now abandoned.

BACKGROUND OF THE INVENTION

1. Field of the Invention

This invention relates to a dried, partially cured, adhesive film, to its method of manufacture, and its use in the joining together of two adjacent surfaces. In particular, the invention relates to the splicing of coated abrasive materials and, even more particularly, to the splicing of coated abrasive materials as in the formation of endless belts.

2. Description of the Prior Art

One method of manufacturing coated abrasive belts involves adhesively joining together two overlapped free ends of a strip of coated abrasive sheet material of a suitable length and width. The demands on an adhesive used in the formation of an endless belt are rather severe because a coated abrasive belt during use is subjected to relatively high tensile and flexural forces. Thus, any adhesive composition used in the formation of belt joints must be strong and flexible as well as provide good adhesion (high peel strength) to prevent delamination of the belt joint upon being subjected to a severe flexing operation such as when running over a small diameter contact roll. Moreover, the adhesive must be resistant to heat, water, lubricants and cutting fluids encountered in various abrading operations.

Over the years the manufacture of coated abrasive belts has involved, by and large, the use of liquid adhesive compositions. These have been, to a large degree, glue or other water-soluble material. However, where water insolubility and heat resistance has been found desirable, insoluble resinous types of adhesives have been used. These adhesive materials include phenol-aldehyde resins, among others, dissolved in suitable organic solvents.

One disadvantage associated with the use of a liquid adhesive composition is that its application, in general, requires a "dwell time" for, among other other things, the removal of solvent. The operator must, in most instances, apply the adhesive composition, wait for a certain period of time to pass for the solvent to evaporate and thereby deposit the adhesive component, and for the adhesive material to cure to some desired point. Only then are the ends superposed preparatory to being joined together. Curing of the adhesive material to some degree before joining is absolutely necessary in order that an inordinate amount of time is not taken during the press cycle. Most importantly, the adhesive material must have sufficient cohesive strength that, on pressing, it will not be squeezed out thus resulting in an adhesive starved joint line and therefore a weak joint.

The "open time" or "permissible dwell time", during which the faying surfaces can be adhesively assembled and a satisfactory bond achieved, must also be observed by the operator. While it is possible for the operator to coat other abrasive strips for belt formation during the dwell time, thus setting up a situation where belts can be somewhat continuously formed, this manner of operation has been found somewhat confusing to an operator. Often-times the adhesively-coated abrasive strips, for one reason or another, are misplaced, or otherwise improperly kept account of by the operator thus resulting in some adhesive compositions not receiving the desirable dwell time and others exceeding it. The result in either instance is formation of a poor belt joint.

A further disadvantage associated with the use of a liquid adhesive composition results from the fact that different operators invariably apply more or less of the adhesive composition than is required for optimum results. In some instances, moreover, the adhesive composition, to provide a sufficiently thick adhesive layer, must be applied in multiple coats because application of a more viscous composition is not possible.

Because of the nature of a liquid adhesive composition and its manner of application, the quality of the joint formed often varies in any particular coated abrasive product and even from belt-to-belt. This lack of uniformity in the manufacture of endless coated abrasive belts is naturally accompanied by complaints from the users of the belts. As a result, over the years, various adhesive compositions have been developed for use in belt manufacture and moreover, various means have been devised to provide better means of quality control. Nevertheless, the problem of obtaining satisfactory belt joints with uniform characteristics remains.

It has been suggested heretofore that preformed adhesive films can be used rather than liquid adhesive compositions. Examplary of the prior art showing these films are U.S. Pat. Nos. 2,060,906; 2,778,169; 2,794,726; 3,406,053; and 3,449,280. However, of the preformed adhesive films commercially available or which have been suggested for use, of which I am aware, none completely satisfy the requirements for the manufacture of coated abrasive belts or do they result in a joint with the most desired physical characteristics.

With some preformed adhesive films suggested heretofore, the films cohesive or adhesive qualities, inferior heat resistance, etc., make it unsuitable for use in a coated abrasive joint wherein it must withstand the rigorous application to which abrasive materials are subjected. Other preformed adhesive films of which I am aware require an excessive curing time or too high a curing temperature to be used at all in the manufacture of coated abrasive belts. Some adhesive films, while suitable for the manufacture of endless belts of certain materials, are unsuitable, because of their curing or joining temperature, for the manufacture of coated abrasive endless belts of other materials.

SUMMARY OF THE INVENTION

In accordance with the general aspects of my invention, I have discovered an adhesive composition which can be provided in film form and in which form it has a relatively low press joining temperature thereby making it possible to use the adhesive film in the bonding of a wide variety of coated abrasive materials.

The adhesive film used in the practice of the invention basically comprises a dried, partially cured reaction product of a composition comprising in admixture a hydroxyl terminated polyurethane polyester and a component having available free isocyanate groups. The use of such an adhesive film makes it unnecessary during belt manufacture to allow for a dwell time during which solvent is evaporated and cure is advanced to a degree resulting in cohesive strength satisfactory for joining under high pressure.

A further, and most important, advantage offered with the practice of my invention is that coated abrasive belts of more uniform quality and physical characteristics can be manufactured repetitively than heretofore thus providing increased customer satisfaction. This results from the fact that not only does an operator need not be concerned with some minimum or maximum dwell time but the same amount of adhesive composition is always provided in the manufacture of belts of any particular coated abrasive material. Thus, no room is left for varying joint properties due to application by an operator of more or less adhesive composition than has been determined previously to be optimally desirable.

Using a dried, partially cured, preformed adhesive film, rather than a liquid adhesive composition, moreover, results in better housekeeping, and less waste of adhesive composition. The dried, adhesive film is further desirable in that in its use no obnoxious solvent is evaporated in the belt making area thus making special ventilation unnecessary.

Quite advantageously, and this is of considerable importance, my invention makes it possible to substantially automate the manufacture of coated abrasive belts. Thus, increased efficiency in belt manufacture, as well as more uniform product, is made possible.

BRIEF DESCRIPTION OF THE DRAWING

The invention will be better understood by referring to the drawing in which like numerals refer to like parts in the various views and in which.

DETAILED DESCRIPTION OF THE INVENTION

Figure 1:
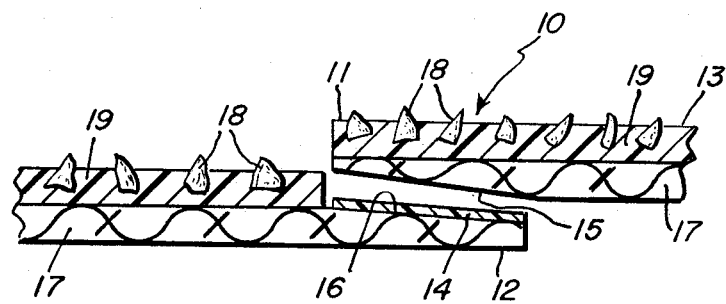
FIG. 1 is a partial cross-sectional view showing the formation of a joint in the manufacture of an endless coated abrasive belt.

Turning now to the drawing, there is disclosed in FIG. 1 thereof, in accordance with the invention, an endless coated abrasive belt 10. The ends 11 and 12 of coated abrasive strip 13, which are joined together by a preformed adhesive film 14, hereinafter more completely described, are shown out of contact with one another for sake of clarity. However, it will be readily understood that, in a completed belt, surfaces 15, 16 of belt ends 11, 12 will be closely adjacent one another and secured together by means of preformed adhesive film 14. In the finished product it will of course not be possible to discern that the adhesive, which in the present figure is shown in greatly exaggerated thickness to better show the invention, was initially a preformed film.

Figure 2:
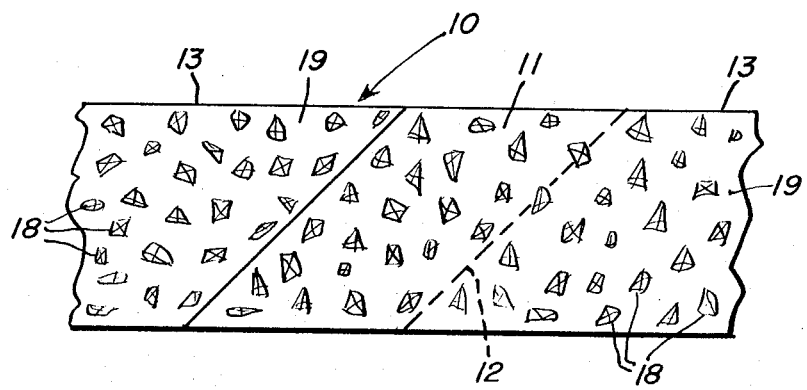
FIG. 2 is a top view, in part, of a completed endless belt showing the overlap joint formed therein.

Abrasive strip material 13, as is usual preparatory to formation of an abrasive belt, is cut to the desired width and length from a suitable sheet of coated abrasive material. The ends 11, 12 of the coated abrasive strip are preferably cut at an angle, e.g., from 30° to 75° with respect to the lengthwise direction, as more clearly shown in FIG. 2 of the drawing. A preferred angle is 55°. However, if desired, the ends of the abrasive strip can be cut normal to the lengthwise direction.

In the practice of my invention, it is preferred, as shown, that surfaces 15, 16, in accordance with usual techniques, be beveled by abrading and skiving, respectively. This provides a narrow area delimited adjacent the free ends of the abrasive strip for application of the adhesive composition, makes for better adhesion, and lesser joint thickness. In general, in skiving the upper portion of end 12 it is preferred to remove all the maker adhesive 19, hereinafter described, from the skived area. A taper of 2–3 mils, as shown, is desired from the trailing edge of the skived portion to the leading edge thereof. The lower surface of end 11 can be back rubbed, wire brushed, sand blasted, or the like to provide an area matching with the skived area on end 12.

The coated abrasive sheet material used in the practice of my invention is of conventional manufacture and forms no part of the invention per se. In general, the abrasive material comprises a backing member 17, and abrasive grain 18 secured to the backing member by means of an adhesive bond or maker 19. Backing member 17 can be of any material conventionally used in the manufacture of coated abrasive sheet material. This includes paper, cloth, vulcanized fiber, and the like sized with various materials depending on the end use of the coated abrasive product. The sizing and filling materials can be starch, glue, filled or otherwise as desired, or of a resinous material such as phenol-aldehyde.

The bonding layer or maker coat 19 can be of a resinous material such as, e.g., phenol-aldehyde, epoxy resin, and the like. However, quite advantageously, my invention can also be used with a glue maker adhesive composition. This layer may have a sand size coat thereover, if desired. Where the sand size coat is of a heat-hardened resinous material, the maker adhesive coat can be of either glue or resinous material.

Abrasive grains 18 can be any of those grain materials, natural or synthetic, used in the manufacture of coated abrasive sheet material. These include flint, emery, garnet, silicon carbide, aluminum oxide, and zirconia-alumina grains of any size.

Adhesive film 14 used in the practice of the invention is the dried, partially cured, reaction product of an adhesive composition having as its essential component a two-component polyurethane adhesive composition. Two-component polyurethane adhesive compositions, as is deemed well known, have as the essential components thereof an isocyanate and a poly-functional active hydrogen-containing component. I have discovered that a particularly suitable adhesive composition is provided for abrasive belt manufacture wherein the active hydrogen-containing component is a hydroxyl terminated polyurethane polyester having a hydroxyl number of from 2 to 15.

Hydroxyl terminated polyurethane polyesters, as is well known, are, in general, prepared by reacting a molar excess of a hydroxyl terminated polyester with a suitable polyisocyanate. Many such polyesters useful for reaction with polyisocyanates are known and are commercially available. They are, in general, formed by esterifying and polymerizing a dibasic or polybasic carboxylic acid, or mixtures of these acids, with a complementary bi- or poly- functional compound containing more than one alcoholic group, or mixtures of these compounds. Suitable acids for reaction to form polyesters, which primarily should be saturated acids, include succinic, glutaric, adipic, pimelic, maleic, azelaic, sebacic, diglycolic, and dimer linoleic, and mixtures of these. Examples of polyhydric alcohols include ethylene glycol; propylene glycol; butylene glycol; diethylene glycol; 1,5-pentanediol; and hexamethylene glycol.

Small proportions of a polyhydric alcohol such as glycerol, castor oil and trimethylol propane may also be used. The reaction of these materials to form polyesters ordinarily involves simple heating for a few hours, usually with removal of water formed during reaction by maintaining a vacuum over the reaction mixture. The acid and alcohol are combined in proportions providing a substantial excess of hydroxyl groups over acid groups and the reaction is carried to a point giving a product having hydroxy groups, preferably terminal, with a hydroxyl number from about 30 to about 140, preferably 50–60, an acid number 0–12, and a molecular weight between about 2000 and 4000.

Reaction of the polyesters with the polyisocyanates involves mixing one or more polyisocyanates with one or more polyesters and heating the mixture until the reaction is substantially complete. The reacted material is then cooled to solidify it and broken up for convenience in handling. Arylene diisocyanates such as 2,4-toluene diisocyanate; 1,5-naphthalene diisocyanate, and m-phenylene diisocyanate are preferred because of toxicity problems with aliphatic isocyanates but aliphatic isocyanates such as hexamethylene diisocyanate or pentamethylene diisocyanate may be used along with or in place of the arylene diisocyanate if proper safety precautions are taken. The isocyanate and polyester are combined in relative proportions of about 0.9 to about 1.4 mols of diisocyanate per mol of polyester.

A polyurethane polyester elastomer, such as is desired in the practice of my invention, is available commercially in solvent solution from United Shoe Machinery Corporation. One such solution is identified as "Bostik 7070" in their bulletin BA20, page 4. "Bostik 7076" is comparable except that a mixture of acetone-toluene is used as the solvent rather than ethyl acetate. The solvent used is, of course, of no consequence and other solvents or diluents suitable as a vehicle for the polyurethane elastomer can be used. Merely by way of example, methyl ethyl ketone may be used, if desired. The polyurethane polyester in Bostik 7076 is believed to be the reaction product of toluene diisocyanate with a hydroxyl terminated polyester of adipic acid and butylene glycol.

The particular isocyanate component utilized in the practice of the invention is not critical so long as it has available sufficient free isocyanate groups to react satisfactorily with the reactive hydrogens and thus cure the adhesive composition to the desired extent. Any organic diisocyanate or polyisocyanate such as triisocyanates and tetraisocyanates, or mixture of diisocyanates, polyisocyanates, or both may be used. Merely by way of example, toluene diisocyanate, polyphenyl polymethylene polyisocyanates such as diphenylmethane 4,4-diisocyanate, triphenyl methane triisocyanate, and the like may be used. Of these materials, the latter two are the most preferred as will hereinafter be appreciated. However, regardless of which one is used, the particular diisocyanate or polyisocyanate used must be either soluble in the solvent used for the polyurethane polyester or dissolved in a solvent compatible therewith. An isocyanate material meeting these requirements and found particularly suitable in the practice of the invention is a product commercially available under the trade designation Mondur CB-75 from Mobay Chemical Company. This product is described in Urethane Coating, Second Edition, published by Mobay and is the reaction product of trimethylol propane and toluene diisocyanate.

As the ultimate curing of the adhesive composition used in the manufacture of the adhesive film depends upon the number of (—NCO) groups present in the isocyanate component, the amount of isocyanate component required depends, of course, on the amount of and particular hydroxyl terminated polyurethane polyester used in the adhesive composition, as well as upon the particular isocyanate used. In general, however, a satisfactory bond will be obtained if the isocyanate component is provided in the adhesive composition in sufficient quantity to provide from about 0.24 gram (—NCO) to about 8.5 grams (—NCO) per 100 grams polyurethane polyester solids, as above described. A preferred range is from about 0.54 gram (—NCO) to about 4.3 grams (—NCO) per 100 grams of the above-mentioned hydroxyl terminated polyurethane polyester.

The preformed adhesive film is, in general, manufactured according to usual film casting techniques. An amount of the two-component polyurethane adhesive composition is cast on a so-called release liner or carrier to result in the desired film thickness after solvent evaporation. These materials are well known and several are available commercially. Such a carrier or release liner may be a polyethylene coated paper or a paper coated with a silicone resin, polytetrafluoethylene, or the like.

The adhesive composition is, in the practice of the invention, applied to the release liner by means of knife-on-roll or reverse roll coating. However, other means of application are obviously suitable. Afterwards, the wet, adhesive coated release liner is heated for a sufficient period of time and at a suitable temperature for the solvent to evaporate from the adhesive composition, thus leaving a dried, tack-free adhesive film and one that is partially cured, yet heat activatable. The film, to provide adequate bond strength when used in a coated abrasive belt joint, on drying, should be at least about 1.5 mils thick. Desirably, the dried, preformed, adhesive film is from about 2.0 to about 5.0 mils thick. A thinner film results in poor bond strength and a thicker film makes for too thick a joint thus resulting in bumping and chattering of the abrasive belt during use.

Heating of the layer of cast adhesive composition is preferably accomplished in a hot air oven. Various types of these ovens are available commercially some of which provide for a flow of air counter-current to the direction of travel of the wet film and such an oven is preferred. The air temperature and the time allowed for drying will, of course, depend on the amount of solvent in the adhesive composition cast. However the time-temperature relationship should provide for substantially complete solvent removal as well as for reaction of the components in and some partial curing of the adhesive film composition. The degree of partial curing desired may vary, depending somewhat on the specific application for the particular film adhesive, as well as the composition thereof. In general, however, the film adhesive should not be cured to such an extent that, on heating in a press, e.g., in the formation of abrasive belts it cannot be heat activated, i.e., merely be softened and tackified. The extent of partial curing should, however, provide sufficient cohesive strength in the adhesive film that it will not unduly flow on application of heat and pressure. With partial curing such as desired in the practice of our invention, the preformed adhesive film will, on application of heat and pressure, flow into intimate contact with the surfaces to be joined yet not be squeezed out from therebetween. Of advantage, partial cures have been found satisfactory which result in an adhesive film which can be heat activated at temperatures, e.g., less than about 275° F, above which damage could result to a conventional coated abrasive backing member.

A desirable partial cure may be obtained in general in heating a film, which initially may be a composition of from about 20 to about 30 percent solids, these solids comprising from about 63 to about 98 percent (by weight) hydroxyl terminated polyurethane and from about 2 to about 37 percent (by weight) isocyanate, after solvent removal for from about 15 to about 60 minutes at from about 300° F. to about 250° F. The adhesive film should not, however, be cured to such an extent that it is not desirably flowable or cannot be activated or tackified with conditions of pressure and heat found desirable in the manufacture of coated abrasive belt joints.

Subsequent to formation of the adhesive film, where continuously manufactured, the adhesive film-carrier combination may then be wound into rolls. Afterwards, or before if desired, the combination may be slit into widths of the desired size and would into rolls of suitable length for use. The adhesive film composition continues curing (moisture from atmosphere, backing member, etc.) even at room temperature. However, the rate of curing is relatively slow and can be retarded even further by storing the adhesive film, as hereinafter more fully described, at relatively low humidity and temperature. Provided the adhesive film is stored in a dry atmosphere at 5° F. or less, it can be used and satisfactory bonds achieved in belt joints even after a storage of more than 9 months. Once the adhesive film is removed from such a low temperature and humidity controlled conditions, it must be used, generally, in from about 8 to about 56 hours depending on atmosphereic conditions. Thus, the adhesive film has a pot life outside the controlled environment of about 8 hrs. at 85° F., 65% relative humidity (R.H.); however, a film of the same composition has a pot life of about 56 hours at 75° F., 25% R.H. In order to retard curing of the adhesive film material, thus in a sense extending the pot life thereof, the rolls of adhesive film are sealed in plastic bags, e.g., of polyethylene, until ready for use. The bags containing the rolls of adhesive film are then maintained under low temperature, e.g., about 0° F. and humidity conditions - e.g. about 5% relative hmidity (R.H.) as beforementioned.

Quite advantageously, I have found that providing a desiccant such as DRIERITE (anhydrous calcium sulfate) in the adhesive film package results in even better retardation of curing during storage. This results from the fact that the adhesive film is moisture curable; thus, removing moisture from the atmosphere in which the film is stored retards its further curing.

When adhesive film is required for the manufacture of belt joints, a suitable number of packages thereof is removed from the controlled environment. Coated abrasive strips of a suitable width and length are provided and the ends of the strips are prepared for belt formation according to usual techniques. An appropriate length of adhesive film-carrier combination is unwound from the roll thereof, is applied to the skived end of the coated abrasive strip material which previously has been positioned as usual on the bottom bar or platen of a platen press and, is then cut off. Quite obviously, if desired, the length of adhesive film-carrier can be cut from the roll before application. A press found suitable in the practice of the invention is one in which both the upper and lower platens are capable of being heated electrically and is capable of exerting a pressure of up to 30 tons on an object located therebetween.

The coated abrasive strip with the adhesive film-release liner thereon is then subjected to light pressure, e.g., about 200 – 400 lbs./in.$^2$ while being heated by the bottom bar only (e.g. about 175° – 350° F.) for about 1 – 5 seconds. Thus, the dried, preformed, partially cured adhesive film is softened and tackified, i.e., heat activated, in preparation to forming the belt joint. On release of the pressure and withdrawal of the upper bar, the release liner is removed. The ends of the coated abrasive strip are then overlapped as shown in FIG. 1, and these overlapped ends are then subjected to heat and pressure as above-mentioned. After the heat-activation operation, the coated abrasive strip with the overlapped ends is then positioned in a similar press and the joining of the two ends is completed. In the practice of the invention, two presses are desirably used. This permits a smoother operation in that one press can be used for activation of the adhesive film while the other can be used for joint formation. However, quite obviously a single press, if desired, can be used to accomplish both operations.

During the press joining cycle, i.e., the joining of the superposed, overlapped coated abrasive ends, both bars are heated. Thus, the adhesive film is subjected to pressure while simultaneously being heated from both sides. In this way the adhesive film is caused to flow into intimate contact with the surfaces to be joined. The joint resulting permits immediate handling of the belt formed. Joint strength is such that on removal of the belt from the press it can be further processed, e.g., cutting to lesser width, if desired, or packaged, immediately on cooling. However, if desired, joining can be accomplished at room temperature but this is generally deemed undesirable and impractical because the time required for an adequate joint to be formed which permits immediate handling is excessive.

The pressure used in joining may be varied as desired, e.g., from about 1,500 lbs./in.$^2$ to about 12,000 lbs./in.$^2$. In general, the time and temperature required to effect optimum joint strength whereby to obtain suitable handling strength of the belt for any particular adhesive composition will, of course, vary with each particular adhesive composition. Somewhat better joints have been made by using elevated temperatures within the range from about 175° F. to about 350° F., a preferred temperature being about 240° F. to about 335° F., for from about 5 seconds to about 30 seconds.

Ultimate or maximum joint strength depends somewhat on atmospheric conditions; however, this is obtained substantially within 24 to 48 hours of belt manufacture at 70° F., 50% R.H. On the other hand, maximum joint strength is obtained substantially in about 8 to 16 hours, at 85° F., 65% R.H. On curing, the primary reaction to obtain optimum strength results from reaction of the excess isocyanate in the adhesive composition with the polyurethane formed therein between the hydroxyl terminated polyurethane-polyester and with atmospheric moisture. The joint strength, on the average, obtained during press joining is at least about 10% or more of that of the ultimate joint strength.

The following examples, which are given for purposes of illustration only and are not intended to be limiting of the inventive concept, will more clearly illustrate the preferred embodiments of the invention.

EXAMPLE 1

An adhesive composition was prepared by blending together in a 55 gallon drum the components shown below in suitable amounts to provide the indicated proportions.

| Components | Percent By Weight Solids Based On Total Weight Solids |
| --- | --- |
| BOSTIK 7076 (21% solids in acetone-toluene solvent) | 77.0 |
| MONDUR CB-75 (75% solids in ethyl acetate) | 23.0 |

Mixing was conducted at room temperature over a period of about 15 minutes. Afterwards the adhesive composition, in which the components are uniformly dispersed, was deposited according to usual roll coating techniques onto a silicone release paper. Such a paper (48 inches wide) is commercially available under the trade designation Silicone Release Liner No. 662 from Weyerhauser Company.

The wet coated silicon release paper or carrier was then festooned and passed through a conventional hot air oven at 17 feet per minute. Therein the adhesive layer was dried and partially cured by means of a counter-current flow of air. This was accomplished by heating the adhesive layer for 15 minutes at 100° F. followed by 30 minutes at 250° F. An adhesive film having a thickness of about 3 mils resulted.

The adhesive film was then slit by usual techniques to provide a film-carrier combination three-eighths inches wide. Afterwards, this combination was wound into rolls of suitable length (300 feet) for use in the manufacture of coated abrasive belts. Some of the rolls were packaged, as before described and stored for subsequent use.

EXAMPLE 2

A suitable strip of 80X RESINALL METALITE cloth coated abrasive material (6 inches × 60 inches) was prepared for formation of an endless belt. The abrasive surface of one end of the abrasive strip was skived by usual techniques thereby removing the abrasive material and the bonding layer and leaving the upper portion of the backing material exposed. The skived surface made an angle of about 55° with respect to the lengthwise direction of the strip. To the skived surface (3/8 × 7.5 inches), which was slightly tapered at an angle of about 5° to the horizontal, was then applied the film adhesive-carrier combination manufactured in Example 1. This was accomplished by providing a strip of adhesive film-carrier matching the skived surface and placing the dried adhesive film directly against this surface, (the coated abrasive strip having been positioned previously on the bottom bar of a conventional platen press.) The release liner was left in position on the adhesive film.

The upper bar of the press was brought down into contact with the release liner, thus providing a pressure of about 387 psi on the adhesive film-carrier and skived belt assembly. The assembly was maintained under this pressure for a period of about 3 seconds while being heated solely by the bottom bar having a surface temperature of about 275° F. This permitted the adhesive film to soften and to become activated in preparation for the subsequent bonding step.

Pressure on the assembly was released and the upper bar or platen was withdrawn from contact with the release liner. The release liner was then removed from the softened, activated adhesive film and the matching, slightly tapered, roughened, bottom surface of the other end of the coated abrasive strip was then positioned in contact with the upper surface of the adhesive film.

The overlapped coated abrasive strip was then positioned in the press and pressed while heated only by the lower bar. A pressure of 387 lbs./in.$^2$ was maintained for 3 seconds (bar temperature 275° F.) after which it was released and the upper bar was slightly withdrawn. The coated abrasive strip was then positioned in a similar press and the upper bar therein was operated so as to press against the overlapped portions of the coated abrasive strip with a pressure of 6500 lbs./in.$^2$. This pressure was maintained while the joint was heated by both bars for about 20 seconds (bar temperatures 240° F.) after which the pressure was released and the thus produced abrasive belt was removed from the press.

On visual examination, the abrasive belt was observed to have a joint thickness not substantially greater than the thickness of the coated abrasive material per se. Moreover, this belt joint was observed to be much neater looking than those generally manufactured using a liquid adhesive composition there being no excess adhesive composition on the abrasive or backside of the belt joint.

The coated abrasive belt thus produced was immediately tested in accordance with ASTM D903-49. However, a specimen size of 1 × 5 inches was used at a separation rate of 5 inches per minute. This had been conditioned for 24 hours prior to testing at 70° F., 50% R.H. The joint was found to have an adhesion peel strength value in excess of 15 pounds/in. of joint width.

On subjecting a belt thus manufactured to severe and continuous flexing in the immediate area of the belt joint on a multi-head oscillating flex fatigue tester, the belt joint was found to exceed 4000 flexes before failure occurred. This test is peculiarly directed at producing delamination failure in the adhesive joint. A belt joint which will withstand 2,400 flexes without failing has been considered good in the past.

These tests, it is believed, indicate the excellence of a joint in coated abrasive material manufactured in accordance with my invention. With such a belt joint, the life of an abrasive belt is extended accordingly because more prolonged periods of operation are attained without joint failure. Thus, more economical use can be made of belts manufactured in accordance with the invention in that more of the abrasive surface can be used.

EXAMPLE 3

Using the same adhesive composition as disclosed in Example 1, sufficient composition was provided on companion release liners to result, on drying and partial curing at the same conditions disclosed in Example 1, in adhesive films having a thickness of 1 mil and 3 mil, respectively.

These adhesive films were used in manufacturing endless belts from 120X RESINALL METALITE abrasive cloth. The manner of manufacture of these belts was that disclosed in Example 2. On evaluation, as before, for flex fatigue, the belt manufactured using the 1 mil adhesive film failed after only 770 flexes. However, the belt manufactured using the 3 mil thick adhesive film exceeded more than 4000 flexes before delaminating.

EXAMPLE 4

The adhesive composition of Example 1 was changed to provide an increased amount of the isocyanate component therein. Analysis of the composition showed there to be 8.5 grams (—NCO) per 100 grams solid polyurethane-polyester component. This adhesive composition was coated on a release liner as in Example 1 to provide an adhesive film 3 mils thick.

The thus formed adhesive film was then used in the manufacture of an endless belt as in Example 2.

On evaluation for flex fatigue, as before, the belt failed after only 740 flexes. Increasing the isocyanate component in the adhesive composition makes the joint excessively brittle. Such an adhesive film is unsatisfactory for use in the manufacture of abrasive belts.

EXAMPLE 5

The adhesive composition was varied in the amount of isocyanate component present to determine the effect thereof on joint characteristics.

b. Joining temperature 200° F.
  The joint, on evaluation, was still intact after more than 3000 flexes.
c. Joining temperature 175° F.
  Joint failed after only 1740 flexes.
d. Joining temperature 150° F.
  On evaluation for flex characteristics, the joint thus produced failed in less than 400 flexes.

EXAMPLE 7

Adhesive films manufactured in accordance with Example 1, after storage in polyethylene bags containing DRIERITE for 9 months at 0° F., 5% R.H., were used in the manufacture of endless belts as disclosed in Example 2. These belts, on evaluation for flexural characteristics, were found to exceed 3600 flexes before delamination.

EXAMPLE 8

The adhesive film composition of Example 1 was partially cured at various conditions to determine the effect thereof on formation of belt joints. A film thickness of 3.0 mils was used. Belt joints were manufactured in accordance with Example 2 except that 120X RESINALL METALITE abrasive cloth was used. Time and temperature conditions for partial curing was as indicated below.

PARTIAL CURING

| TIME, min. | TEMP °F | FLEXES TO FAILURE |
| --- | --- | --- |
| 5 | 250 | 780 |
| 15 | 250 | 1200 |
| 30 | 250 | 3000+ |
| 300 | 250 | 3000+ |
| 360 | 250 | * |

*film had cured to such an extent it could not be tackified for joining.

| COMPONENT | % BY WEIGHT SOLIDS/TOTAL SOLIDS | | | | | | |
| --- | --- | --- | --- | --- | --- | --- | --- |
| BOSTIK 7076 | 99.0 | 98.0 | 96.5 | 92.2 | 86.0 | 75.3 | 63.5 |
| MONDUR CB75 | 1.0 | 2.0 | 3.5 | 7.8 | 14.0 | 24.7 | 36.5 |
| (—NCO/100 g Polyurethane-Polyester Solids) | 0.15 | 0.24 | 0.54 | 1.05 | 2.15 | 4.3 | 7.5 |
| No. Flexes To Failure | 600 | 4000 | 5000+ | 5000+ | 5000+ | 4000+ | 3200+ |

Thus it is seen from the above tabulated data and the results from Example 4, that belt joints manufactured using a preformed film in which the adhesive composition contains more than 8.5 grams or less than 0.24 grams (—NCO) per 100 grams solid polyurethane-polyester will result in an unsatisfactory coated abrasive belt.

EXAMPLE 6

Endless abrasive belts were manufactured as in Example 2 using the adhesive film of Example 1 except that belt joining conditions were varied as indicated below:

a. Joining temperatures 335° F.
  A thinner joint resulted, and on evaluating flex characteristics, the joint was still intact after more than 3000 flexes.

Partial curing was subsequent to a 30 minute air dry at 100° F. for evaporation of solvent.

EXAMPLE 9

An endless abrasive belt was manufactured according to the procedure disclosed in Example 2 except that 100J RESINIZED METALITE abrasive cloth was used. This abrasive material is manufactured using a glue maker coat and a phenolic resin size coat. On evaluation for flex characteristics, the joint withstood more than 3000 flexes before failure. Thus, it is seen that by my invention an adhesive film is provided suitable for use in the manufacture of belts from coated abrasive material other than that containing heat resistant resinous maker adhesives.

EXAMPLE 10

An adhesive composition was prepared of the following formulation:

| COMPONENTS | PERCENT BY WEIGHT SOLIDS BASED ON TOTAL WEIGHT SOLIDS |
| --- | --- |
| BOSTIK 7076 | 89.5 |
| MONDUR TM* | 10.5 |

(Mondur TM is available from Mobay Chemical Company and is their trade designation for triphenyl methane triisocyanate. The above amount provides 0.84 grams -NCO per 100 grams Bostik 7076 solids.

Two wet films (30 mil) were cast onto release paper as previously set forth in Example 1. After air drying for 15 minutes, one film was heated for 10 minutes at 250° F., while the other was heated for 20 minutes.

Abrasive belt joints were formed with the partially cured adhesive films (3.0 mil thick) according to the manner set forth in Example 2 except that 120X RESI-NALL METALITE abrasive cloth was used.

On flex fatigue testing as before, after conditioning for 24 hours at 70° F., 50% R.H., the joint in which the film had been partially cured for 10 minutes, failed only after being subjected to 8460 flexes. Quite unexpectedly, the other joint (20 minutes partial cure) exceeded 24,000 flexes before failure.

EXAMPLE 11

An adhesive composition was prepared by admixing the components indicated below:

| COMPONENT | PERCENT BY WEIGHT SOLIDS BASED ON TOTAL WEIGHT SOLIDS |
| --- | --- |
| BOSTIK 7076 | 98.0 |
| MONDUR MR* | 2.0 |

*MONDUR MR is commercially available from Mobay Chemical Company and is their trade designation for diphenylmethane 4,4-diisocyanate (methylene bis(4 phenyl isocyanate). The amount -NCO groups made available is 3.0 grams.

A film was cast in the manner disclosed in Example 10 except that after air drying the film was partially cured by heating for 45 minutes at 250° F.

On evaluating an abrasive belt incorporating this film adhesive, such as disclosed in the preceding example, failure was found to occur only after more than 4500 flexes.

EXAMPLE 12

Over a period of several months, the performance of coated abrasive belts made according to the invention herein, i.e., using a partially cured, preformed adhesive film, was compared with a similar number of belts from manufacturing using a similar but liquid adhesive composition. Although substantially no belts manufactured according to the invention failed because of premature joint failure, a very high percentage of belts failed using the liquid adhesive composition. These failures were determined to have occurred because of a variety of reasons. These include overcuring the adhesive composition before assembling the two belt ends together, application of an insufficient amount of adhesive to the coated abrasive end, and starvation of the bond line. The latter defect results because of the adhesive composition squeezing out from between the superposed ends during pressing.

Although the preformed adhesive films of my invention are particularly useful in the manufacture of coated abrasive belts, they obviously are not so limited. They can also be used in the laminating together of various similar or dissimilar materials, e.g., metals, such as aluminum and plastic lamina of various types, e.g., polyester films, as well as wood, cloth, and paper lamina.

As many different embodiments of my invention will appear to those skilled in the art of adhesive bonding, it is to be understood that the specific embodiments of the invention, as presented herein, are intended by way of illustration only and not limiting on the invention, but that the limitations thereon are to be determined only from the appended claims.

What I claim is:

1. A coated abrasive having its ends joined together by dry, heat-activatable, preformed adhesive film comprising the reaction product of a composition comprising in admixture a hydroxyl terminated polyurethane-polyester having a hydroxyl number of from about 2 to about 15 and a component having available free isocyanate groups, the available isocyanate groups in the composition being present in the amount of from about 0.24 grams to about 8.5 grams per 100 grams (solid) of said polyurethane-polyester, said adhesive film being only partially cured so that it can be subsequently tackified and softened with application of heat in the range of from 175°F to 350°F for from 5 to 1 second, respectively.

2. The coated abrasive according to claim 1 wherein the isocyanate component is triphenyl methane triisocyanate.

3. The coated abrasive according to claim 1 wherein the isocyanate component is diphenylmethane 4,4'-diisocyanate.

4. The coated abrasive according to claim 1 wherein the isocyanate component is an isocyanate terminated polyurethane reaction product of trimethylol propane and toluene diisocyanate.

5. The coated abrasive according to claim 1 wherein the thickness of the film is at least about 1.5 mils.

6. Method of joining abrasive material together comprising the following procedural steps:

a. providing a dry, heat-activatable, preformed, at least partially cured adhesive film comprising the reaction product of a hydroxyl terminated polyurethane-polyester with a component having available free isocyanate-groups;

b. preparing two free ends of coated abrasive material to be joined together in overlapped position;

c. positioning the preformed adhesive film on the abrasive side of one of said ends of said abrasive material;

d. heating said preformed adhesive film at a temperature of from 175° to 350°F for 5 to 1 second respectively, thereby to soften and tackify the film;

e. overlapping the other free end of said abrasive material with said one end whereby said softened, tacky, partially cured, adhesive film is located between the ends to be joined;

f. heating said overlapped ends and adhesive film from 175°F to 350°F for 30 to 5 seconds, respectively, while subjecting the same to pressure of from 1500 to 12,000 lbs/in.$^2$, said heat and pressure being sufficient to cause said adhesive film to be further softened and flowed into intimate contact with the surfaces of the ends to be joined; and g. further curing said adhesive in a moist atmosphere at room temperature thereby to obtain maximum joint strength.

7. Method according to claim 6 wherein said partial curing of the adhesive film is obtained by heating the solvent free film for from 15 to 60 minutes at from about 300° F. to about 250° F.

* * * * *